US012020716B2

(12) United States Patent
Tu et al.

(10) Patent No.: US 12,020,716 B2
(45) Date of Patent: Jun. 25, 2024

(54) PROCESSING METHOD OF SOUND WATERMARK AND SOUND WATERMARK GENERATING APPARATUS

(71) Applicant: Acer Incorporated, New Taipei (TW)

(72) Inventors: Po-Jen Tu, New Taipei (TW); Jia-Ren Chang, New Taipei (TW); Kai-Meng Tzeng, New Taipei (TW)

(73) Assignee: Acer Incorporated, New Taipei (TW)

( * ) Notice: Subject to any disclaimer, the term of this patent is extended or adjusted under 35 U.S.C. 154(b) by 228 days.

(21) Appl. No.: 17/749,158

(22) Filed: May 20, 2022

(65) Prior Publication Data

US 2023/0197088 A1 Jun. 22, 2023

(30) Foreign Application Priority Data

Dec. 21, 2021 (TW) ................................ 110147950

(51) Int. Cl.
*G10L 19/018* (2013.01)
*G10L 19/008* (2013.01)
*G10L 19/26* (2013.01)

(52) U.S. Cl.
CPC .......... *G10L 19/018* (2013.01); *G10L 19/008* (2013.01); *G10L 19/26* (2013.01)

(58) Field of Classification Search
None
See application file for complete search history.

(56) References Cited

U.S. PATENT DOCUMENTS

| | | | |
|---|---|---|---|
| 10,236,006 | B1 | 3/2019 | Gurijala et al. |
| 2014/0160250 | A1 | 6/2014 | Pomerantz et al. |

FOREIGN PATENT DOCUMENTS

| | | |
|---|---|---|
| CN | 102216941 | 10/2011 |
| CN | 102237093 | 11/2011 |
| CN | 103413552 | 11/2013 |
| CN | 102968993 | 8/2016 |
| TW | 200527302 | 8/2005 |
| TW | 201312550 | 3/2013 |

OTHER PUBLICATIONS

D. Gruhl et al., Echo Hiding, 1996 Int'l Workshop on Information Hiding 295 (MIT, 1996) (Year: 1996).*

* cited by examiner

*Primary Examiner* — Walter F Briney, III
(74) *Attorney, Agent, or Firm* — JCIPRNET

(57) ABSTRACT

A processing method of a sound watermark and a sound watermark generating apparatus are provided. The method includes the following. A conversation-received sound signal sound signal is obtained by a sound receiver. A reflected sound signal is generated according to a virtual reflection condition and the conversation-received sound signal. A first watermark sound signal is generated according to a watermark identification code and the reflected sound signal. A second watermark sound signal is generated according to a sound signal distance value and the first watermark sound signal. An output watermark sound signal is generated by synthesizing the first watermark sound signal and the second watermark sound signal.

20 Claims, 7 Drawing Sheets

PROCESSING METHOD OF SOUND WATERMARK AND SOUND WATERMARK GENERATING APPARATUS

CROSS-REFERENCE TO RELATED APPLICATION

This application claims the priority benefit of Taiwanese application no. 110147950, filed on Dec. 21, 2021. The entirety of the above-mentioned patent application is hereby incorporated by reference herein and made a part of this specification.

BACKGROUND

Technical Field

The disclosure relates to a sound signal processing technology. Particularly, the disclosure relates to a processing method of a sound watermark and a sound watermark generating apparatus.

Description of Related Art

Remote conferences enable people in different locations or spaces to have conversations, and conference-related equipment, protocols, and applications are also well developed. It is worth noting that some real-time conference programs may synthesize voice signals with watermark sound signals and use them to identify speaking persons.

Inevitably, if a sound signal is interfered with by noise, a correct rate of determining a watermark at a receiving end may be decreased, thus affecting voice components of a user in the sound signal on a conversation transmission path.

SUMMARY

The embodiments of the disclosure provide a processing method of a sound watermark and a sound watermark generating apparatus, in which a watermark sound signal that is generated effectively combats noise, improving conversation quality.

A sound watermark processing method according to an embodiment of the disclosure is adapted for a conference terminal. The conference terminal includes a sound receiver. The processing method of a sound watermark includes (but is not limited to) the following. A conversation-received sound signal is obtained through the sound receiver. A reflected sound signal is generated according to a virtual reflection condition and the conversation-received sound signal. The virtual reflection condition includes a positional relationship between the sound receiver, a sound source, and two external objects. The reflected sound signal is a sound signal obtained from simulating a sound emitted by the sound source reflected by one of the external objects and recorded by the sound receiver. A first watermark sound signal is generated according to a watermark identification code and the reflected sound signal. A second watermark sound signal is generated according to a sound signal distance value and the first watermark sound signal. The sound signal distance value is determined according to a high/low-frequency sound ratio of the reflected sound signal. The sound signal distance value is related to a distance difference between two reflection distances of the sound emitted by the sound source under the positional relationship reflected by the two external objects and reaching the sound receiver. The first watermark sound signal and the second watermark sound signal are synthesized to generate an output watermark sound signal.

A sound watermark generating apparatus according to an embodiment of the disclosure includes (but is not limited to) a memory and a processor. The memory is configured to store a programming code. The processor is coupled to the memory. The processor is configured to load and execute the programming code to: obtain a conversation-received sound signal through a sound receiver; generate a reflected sound signal according to a virtual reflection condition and the conversation-received sound signal; generate a first watermark sound signal according to a watermark identification code and the reflected sound signal; generate a second watermark sound signal according to a sound signal distance value and the first watermark sound signal; and synthesize the first watermark sound signal and the second watermark sound signal to generate an output watermark sound signal. The virtual reflection condition includes a positional relationship between the sound receiver, a sound source, and two external objects. The reflected sound signal is a sound signal obtained from simulating a sound emitted by the sound source reflected by one of the external objects and recorded by the sound receiver. The sound signal distance value is determined according to a high/low-frequency sound ratio of the reflected sound signal. The sound signal distance value is related to a distance difference between two reflection distances of the sound emitted by the sound source under the positional relationship reflected by the two external objects and reaching the sound receiver.

Based on the foregoing, in the processing method of a sound watermark and the sound watermark generating apparatus according to the embodiments of the disclosure, based on the high/low-frequency sound ratio of the conversation-received sound signal, the sound signal distance value between two reflected sound signals to be simulated is determined, and two watermark sound signals are generated accordingly. Thereby, by outputting two synthesized watermark sound signals, the power of the overall watermark sound signal can be reduced, and the accuracy of determining the watermark identification code can be improved.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
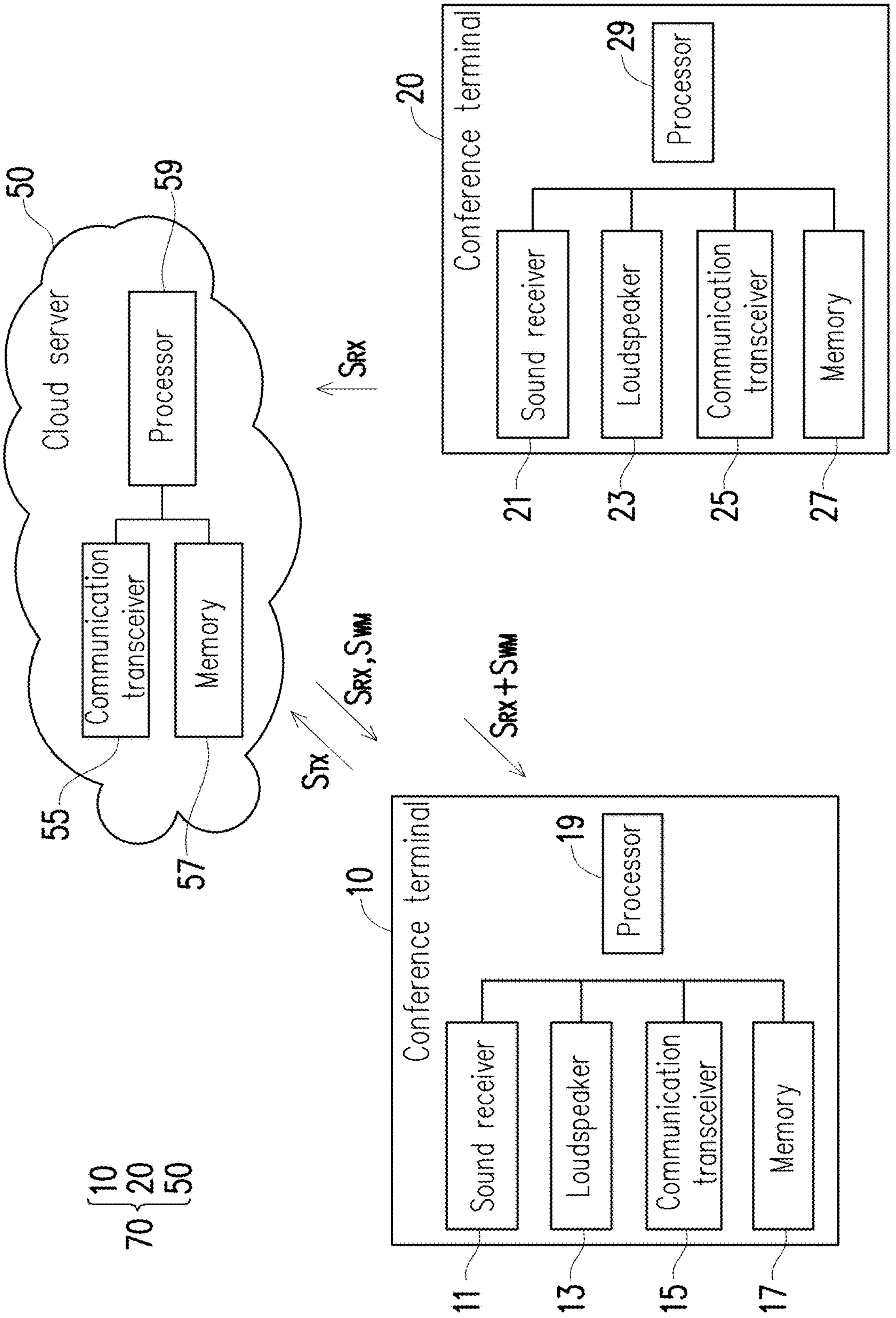
FIG. 1 is a schematic diagram of a conference conversation system according to an embodiment of the disclosure.

FIG. 1 is a schematic diagram of a conference conversation system 1 according to an embodiment of the disclosure. With reference to FIG. 1, the voice communication system 1 includes but is not limited to conference terminals 10, 20 and a cloud server 50.

The conference terminals 10, 20 may be a wired phone, a mobile phone, an Internet phone, a tablet computer, a desktop computer, a notebook computer, or a smart speaker.

The conference terminal 10 includes (but is not limited to) a sound receiver 11, a loudspeaker 13, a communication transceiver 15, a memory 17, and a processor 19.

The sound receiver 11 may be a microphone in, for example, a dynamic, condenser, or electret condenser form. The sound receiver 11 may also be a combination of other electronic components, analog-to-digital converters, filters, and audio processors that receive sound waves (e.g., human voice, environmental sound, and machine operation sound) and convert the sound waves into sound signals. In an embodiment, the sound receiver 11 is configured to receive/record sounds of a speaking person to obtain a conversation-received sound signal. In some embodiments, the conversation-received sound signal may include the sound of the speaking person, the sound emitted by the loudspeaker 13, and/or other environmental sounds.

The loudspeaker 13 may be a horn or a sound amplifier. In an embodiment, the loudspeaker 13 is configured to play sounds.

The communication transceiver 15 is, for example, a transceiver (which may include, but is not limited to, elements such as a connection interface, a signal converter, and a communication protocol processing chip) that supports wired networks such as Ethernet, optical fiber networks, or cables. The communication transceiver 15 may also be a transceiver (which may include, but is not limited to, elements such as an antenna, a digital-to-analog/analog-to-digital converter, and a communication protocol processing chip) that supports wireless networks such as Wi-Fi, fourth-generation (4G), fifth-generation (5G), or later-generation mobile networks. In an embodiment, the communication transceiver 15 is configured to transmit or receive data.

The memory 17 may be any type of fixed or removable random access memory (RAM), read only memory (ROM), flash memory, a hard disk drive (HDD), a solid-state drive (SSD), or similar elements. In an embodiment, the memory 17 is configured to store programming codes, software modules, configurations, data (e.g., sound signals, watermark identification codes, or watermark sound signals), or files.

The processor 19 is coupled to the sound receiver 11, the loudspeaker 13, the communication transceiver 15, and the memory 17. The processor 19 may be a central processing unit (CPU), a graphic processing unit (GPU), or any other programmable general-purpose or special-purpose microprocessor, digital signal processor (DSP), programmable controller, field programmable gate array (FPGA), application-specific integrated circuit (ASIC), or other similar elements or a combination of the above elements. In an embodiment, the processor 19 is configured to perform all or part of operations of the conference terminal 10, and may load and execute the software modules, files, and data stored in the memory 17.

The conference terminal 20 includes (but is not limited to) a sound receiver 21, a loudspeaker 23, a communication transceiver 25, a memory 27, and a processor 29. For the implementation aspects and functions of the sound receiver 21, the loudspeaker 23, the communication transceiver 25, the memory 27, and the processor 29, reference may be made to the above description of the sound receiver 11, the loudspeaker 13, the communication transceiver 15, the memory 17, and the processor 19, which will not be repeated herein. The processor 29 is configured to perform all or part of operations of the conference terminal 20, and may load and execute the software modules, files, and data stored in the memory 27.

The cloud server 50 is directly or indirectly connected to the conference terminals 10, 20 via a network. The cloud server 50 may be a computer system, a server, or a signal processing device. In an embodiment, the conference terminals 10, 20 may also serve as the cloud server 50. In another embodiment, the cloud server 50 may serve as an independent cloud server different from the conference terminals 10, 20. In some embodiments, the cloud server 50 includes (but is not limited to) a same or similar communication transceiver 55, memory 57, and processor 59, and the implementation aspects and functions of the elements will not be repeatedly described.

In an embodiment, a sound watermark generating apparatus 70 may be the conference terminals 10, 20, and/or the cloud server 50. The sound watermark generating apparatus 70 is configured to generate a watermark sound signal and will be described in detail in subsequent embodiments.

Hereinafter, a method according to an embodiment of the disclosure in combination with the various devices, elements, and modules in the conference communication system 1 will be described. Each process flow of the method may be adjusted according to the implementation, and is not limited thereto.

It should also be noted that, for ease of description, the same element may perform the same or similar operations, and will not be repeatedly described. For example, the processor 19 of the conference terminal 10, the processor 29 of the conference terminal 20, and/or the processor 59 of the cloud server 50 may each perform a method same as or similar to the method of the embodiments of the disclosure.

Figure 2:
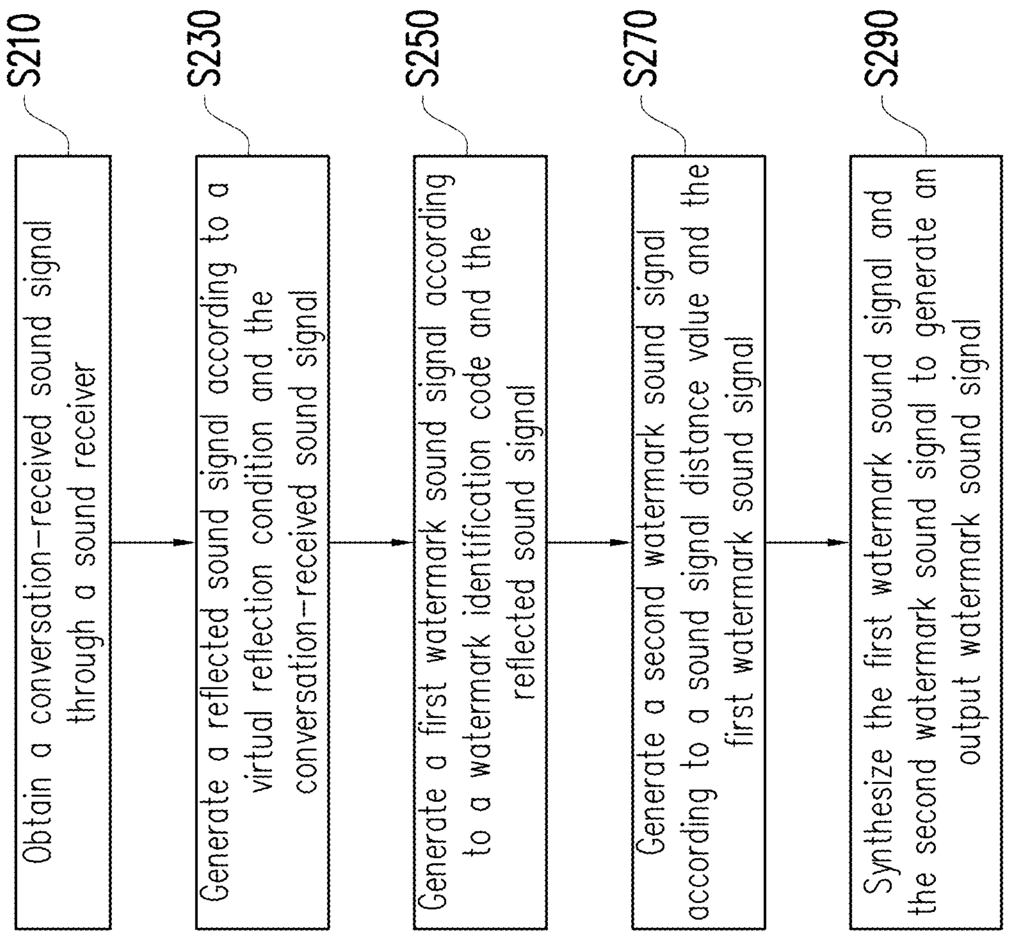
FIG. 2 is a flowchart of a processing method of a sound watermark according to an embodiment of the disclosure.

FIG. 2 is a flowchart of a processing method of a sound watermark according to an embodiment of the disclosure. With reference to FIG. 2, the processor 29 obtains a conversation-received sound signal $S_{Rx}$ by recording through the sound receiver 21 (step S210). Specifically, assuming that the conference terminals 10, 20 establish a conference call, for example, by video software, voice call software, or a phone call, then speaking persons may start speaking. After sounds are recorded/received by the sound receiver 21, the processor 29 obtains the conversation-received sound signal $S_{Rx}$. The conversation-received sound signal $S_{Rx}$ is related to voice contents of the speaking person corresponding to the conference terminal 20 (and may also include environmental sounds or other noise). The processor 29 of the conference terminal 20 may transmit the conversation-received sound signal $S_{Rx}$ through the communication transceiver 25 (i.e., through a network interface). In some embodiments, the conversation-received sound signal $S_{Rx}$ may be performed with echo cancellation, noise filtering, and/or other sound signal processing.

The processor 59 of the cloud server 50 receives the conversation-received sound signal $S_{Rx}$ from the conference terminal 20 through the communication transceiver 55. The processor 59 generates a reflected sound signal $S'_{Rx}$ according to a virtual reflection condition and the conversation-received sound signal (step S230). Specifically, general echo cancellation algorithms may adaptively cancel components (e.g., the conversation-received sound signal $S_{Rx}$ on a conversation-received path) belonging to reference signals in sound signals received by the sound receivers 11, 21 from the outside. The sounds recorded by the sound receivers 11, 21 include the shortest paths from the loudspeakers 13, 23 to the sound receivers 11, 21 and different reflection paths (i.e., paths formed when sounds are reflected by external objects) of the environment. Positions of reflection affect the time delay and the amplitude attenuation of the sound signal. In addition, the reflected sound signal may also come from different directions, resulting in phase shifts. In the embodiments of the disclosure, the sound signal $S_{Rx}$ of a known conversation receiving path is utilized to generate a virtual/simulated reflected sound signal that can be cancelled by an echo cancellation mechanism, and to accordingly generate a watermark sound signal $S_{WM}$.

Figure 4:
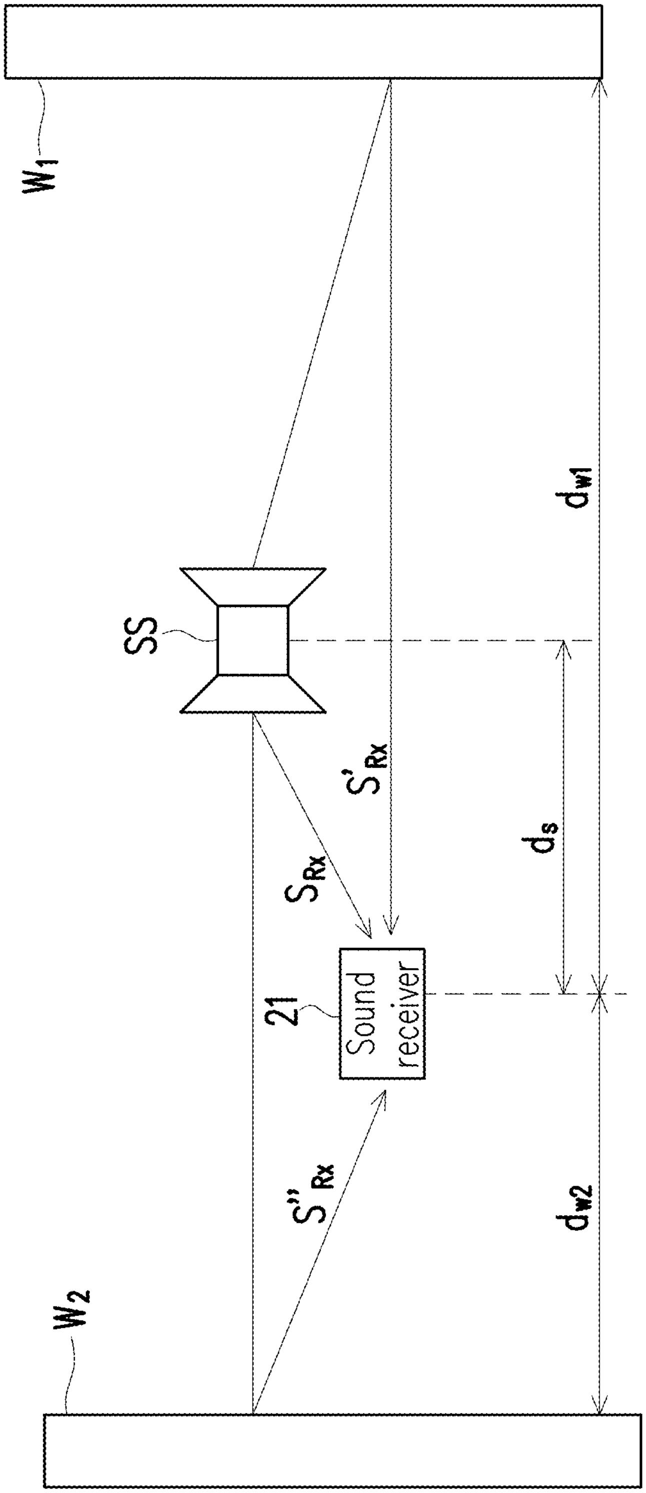
FIG. 4 is a schematic diagram showing a virtual reflection condition according to an embodiment of the disclosure.

In an embodiment, the processor 59 may determine a time delay and an amplitude attenuation of the reflected sound signal $S'_{Rx}$ relative to the conversation-received sound signal $S_{Rx}$ according to a positional relationship. For example, FIG. 4 is a schematic diagram showing a virtual reflection condition according to an embodiment of the disclosure. With reference to FIG. 4, it is assumed that the virtual reflection condition includes two walls (i.e., two external objects). Under a condition that a distance between the sound receiver 21 and a sound source SS is $d_s$ (e.g., 0.3, 0.5, or 0.8 meters) and a distance between the sound receiver 21 and a wall $W_1$ is $d_{w1}$ (e.g., 1, 1.5, or 2 meters), the relationship between the reflected sound signal $S'_{Rx}$ and the conversation-received sound signal $S_{Rx}$ may be expressed as follows:

$$s'_{Rx}(n)=\alpha_1 \cdot s_{Rx}(n-n_{w1}) \tag{1}$$

where $\alpha_1$ is the amplitude attenuation caused by a first reflection (i.e., the reflection of a sound signal blocked by the wall $W_1$), n is the sampling point or time, $n_{w1}$ is the time delay caused by a first reflection distance (i.e., the distance from the sound source SS through the wall $W_1$ to the sound receiver 21).

With reference to FIG. 2, the processor 59 generates a first watermark sound signal according to a watermark identification code and the reflected sound signal (step S250). Specifically, the processor 59 shifts a phase of the reflected sound signal according to the watermark identification code to generate the first watermark sound signal. During operation of a general echo cancellation mechanism, compared to the phase shift of the reflected sound signal, changes in the time delay and the amplitude of the reflected sound signal have a greater influence on errors of the echo cancellation mechanism. With the changes, it is like being in a completely new interfering environment to which the echo cancellation mechanism needs to be re-adapted. Therefore, in the watermark identification code of the embodiments of the disclosure, the first watermark sound signals corresponding to different values have only phase differences, but the time delay and the amplitude are the same. In other words, the first watermark sound signals include one or more phase-shifted reflected sound signals.

In an embodiment, a filter may be selected as the processor 59 to generate a filtered reflected sound signal. Specifically, the general echo cancellation mechanism processes sound signals at a low frequency (e.g., 2 kilohertz (kHz) or 3 kHz and below) with a slower rate of convergence, but processes sound signals at a high frequency (e.g., 3 kHz or 4 kHz and above) with a faster rate of convergence (e.g., 10 milliseconds (ms) and below). Therefore, based on the watermark identification code alone, the processor 59 may shift the phase of the reflected sound signal (e.g., a first reflected sound signal) passing through high-pass filtering (e.g., only passing sound signals at a frequency of 3 kHz or 4 kHz and above), making interference of signals difficult to be perceived (i.e., the high-frequency sound signal is at a frequency outside the hearing range of humans).

In another embodiment, the processor 59 may also not perform specific frequency filtering on the reflected sound signal.

In an embodiment, the watermark identification code is encoded in a multi-based positional numeral system, and the multi-based positional numeral system provides multiple values at one bit or each of multiple bits of the watermark identification code. Taking a binary system as an example, the value of each bit in the watermark identification code may be “0” or “1”. Taking a hexadecimal system as an example, the value of each bit in the watermark identification code may be “0”, “1”, “2”, . . . , “E”, or “F”. In another embodiment, the watermark identification code is encoded with an alphabet, a character, and/or a symbol. For example, the value of each bit in the watermark identification code may be any one of “A” to “Z” among English alphabets.

In an embodiment, the different values at the bits in the watermark identification code correspond to different phase shifts. For example, assuming that a watermark identification code $W_O$ is in a base-N positional numeral system (where N is a positive integer), then an N number of values may be provided for each bit. The N number of different values respectively correspond to different phase shifts $\varphi_1$ to $\varphi_N$. For another example, assuming that the watermark identification code $W_O$ is in a binary system, then two values (i.e., 1 and 0) may be provided for each bit. The two different values respectively correspond to two phase shifts $\varphi$ and $-\varphi$. For example, the phase shift $\varphi$ is 90°, and the phase shift $-\varphi$ is −90° (i.e., −1).

The processor 59 may shift the phase of the reflected sound signal (whether passing through high-pass filtering or not) according to the value of one or more bits in the watermark identification code. Taking a base-N positional numeral system as an example, the processor 59 selects one or more of the phase shifts $\varphi_1$ to $\varphi_N$ according to one or more values in the watermark identification code, and performs phase shift using the selected one of the phase shifts $\varphi_1$ to $\varphi_N$. For example, if the value of the first bit of the watermark identification code is 1, an output phase-shifted reflected sound signal $S\varphi_1$ is shifted by $\varphi_1$ relative to the reflected sound signal, and inference may be made by analogy for other reflected sound signals $S_{\varphi N}$. The phase shift may be achieved using Hilbert transform or other phase shift algorithms.

In an embodiment, if the filtering process is adopted for the reflected sound signal, then the processor 59 may further synthesize one or more phase-shifted reflected sound signals and reflected sound signals (e.g., the first reflected sound signal) passing through low-pass filtering (e.g., only passing sound signals at a frequency of 4 kHz and below) to generate the first watermark sound signal. In another embodiment, if the filtering process is not adopted for the reflected sound signal, the processor 59 may take one or more phase-shifted reflected sound signals as the first watermark sound signal.

With reference to FIG. 2, the processor 59 generates a second watermark sound signal according to a sound signal distance value and the first watermark sound signal (step S270). Specifically, the second watermark sound signal is another reflected sound signal (hereinafter referred to as a second reflected sound signal) corresponding to the first reflected sound signal, and is related to a difference between time delays of the two reflected sound signals. Taking FIG. 4 as an example, it is assumed that the first reflected sound signal $S'_{Rx}$ simulates a sound signal reflected by the wall $W_1$, and the second reflected sound signal $S''_{Rx}$ simulates a sound signal reflected by a wall $W_2$. Under a condition that a distance between the sound receiver 21 and the other wall $W_2$ is $d_{w2}$ (e.g., 1, 1.5, or 2 meters), the relationship between the second reflected sound signal $S''_{Rx}$ and the conversation-received sound signal $S_{Rx}$ may be expressed as follows:

$$S''_{Rx}(n)=\alpha_2 \cdot S_{Rx}(n-n_{w2}) \tag{2}$$

where $\alpha_2$ is the amplitude attenuation caused by a second reflection (i.e., the reflection of a sound signal blocked by the wall $W_2$), n is the sampling point or time, $n_{w2}$ is the time delay caused by a second reflection distance (i.e., the distance from the sound source SS through the wall $W_2$ to the sound receiver 21). In other words, the two reflected sound signals respectively simulate the sound signals reflected by two external objects.

It is worth noting that a difference between the time delay caused by the second reflection distance and the time delay caused by the first reflection distance (or a difference between transmission times of the sound signals reflected by two external objects) (i.e., a sound signal distance value Δn) may be expressed as follows:

$$\Delta n=n_{w2}-n_{w1} \tag{3}$$

and the cause of sound delay mainly lies in the transmission distance of the sound signal. Therefore, the sound signal distance value is also related to, under the positional relationship of the set virtual reflection condition, a distance difference between the two reflection distances of sounds emitted by the sound source SS respectively reflected by two external objects (e.g., the walls $W_1$ and $W_2$) and reaching the sound receiver 21.

Assuming that the sound signal distance value Δn is far smaller than the time delay corresponding to any reflected signal (e.g., $\Delta n \ll n_{w1}$), then the two reflection distances (e.g., the first reflection distance and the second reflection distance) are almost equal or completely equal, and the amplitude attenuations of the two reflected sound signals (e.g., the first reflected sound signal and the second reflected sound signal) should also be almost equal or completely equal (e.g., $\alpha_1 \cong -\alpha_2$). Therefore, low-frequency parts of the two reflected sound signals after being superimposed/synthesized are canceled against each other, thus reducing the power of the overall watermark sound signal, and making it difficult for users to perceive the watermark sound signal that is added.

It is worth noting that the conversation-received sound signal $S_{Rx}$ may change with time. It is found through experiments that, if the sound signal distance value Δn may be changed appropriately with the change of the conversation-received sound signal $S_{Rx}$, it helps to combat noise interference. In the embodiments of the disclosure, the sound signal distance value is determined according to a high/low-frequency sound ratio of the reflected sound signal (e.g., the first reflected sound signal).

In an embodiment, after the processor 59 generates the reflected sound signal, the processor 59 performs low-pass filtering on the reflected sound signal to generate a low-frequency sound signal. In addition, the processor 59 performs high-pass filtering on the reflected sound signal to generate a high-frequency sound signal. The high/low-frequency sound ratio is a power ratio between the low-frequency sound signal and the high-frequency sound signal.

Figure 3:
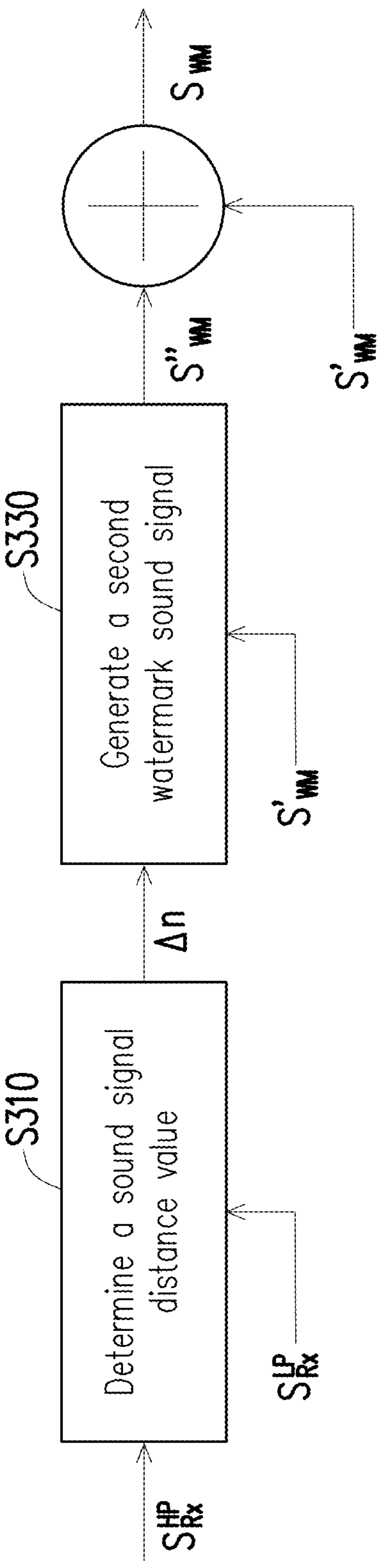
FIG. 3 is a flowchart of a method for generating a sound watermark according to an embodiment of the disclosure.

FIG. 3 is a flowchart of a method for generating a sound watermark $S_{WM}$ according to an embodiment of the disclosure. With reference to FIG. 3, the processor 59 determines the sound signal distance value Δn according to a low-frequency sound signal $S_R$ (e.g., a sound signal at 2 kHz and below) and a high-frequency sound signal $S_{Rx}^{HP}$ (e.g., a sound signal at 2 kHz and above) in the reflected sound signal (step S310). In an embodiment, if the power of the high-frequency sound signal $S_{Rx}^{HP}$ is not less than the power of the low-frequency sound signal $S_{Rx}^{LP}$, the processor 59 may set the sound signal distance value Δn to a first value; if the power of the high-frequency sound signal $S_{Rx}^{HP}$ is less than the power of the low-frequency sound signal $S_{Rx}^{LP}$, the processor 59 may set the sound signal distance value Δn to a second value, where the first value is greater than the second value.

For example, in the conversation-received sound signal $S_{Rx}$, when a power of the high-frequency sound signal $S_{Rx}^{HP}$ is not less than a power of the low-frequency sound signal $S_{Rx}^{LP}$, the sound signal distance value Δn is set to 5 (i.e., the first value). In addition, in the conversation-received sound signal $S_{Rx}$, when the power of the high-frequency sound signal $S_{Rx}^{HP}$ is less than the power of the low-frequency sound signal $S_{Rx}^{LP}$, the sound signal distance value Δn is set to 4 (i.e., the second value). The relationship between the sound signal distance value Δn, a power $P_{Rx}^{LP}$ of the low-frequency sound signal $S_{Rx}^{LP}$, and a power $P_{Rx}^{HP}$ of the high-frequency sound signal $S_{Rx}^{HP}$ may be expressed as follows:

$$\Delta n = \begin{cases} 5, & P_{Rx}^{HP} \geq P_{Rx}^{LP} \\ 4, & P_{Rx}^{HP} < P_{Rx}^{LP} \end{cases} \tag{4}$$

where $P_{Rx}^{HP}$ is the power of the high-frequency sound signal $S_{Rx}^{HP}$ of the conversation-received sound signal $S_{Rx}$, and $P_{Rx}^{LP}$ is the power of the low-frequency sound signal $S_{Rx}^{LP}$ of the conversation-received sound signal $S_{Rx}$. In other words, the power ratio between the high and low-frequency sound signals is $P_{Rx}^{HP}/P_{Rx}^{LP}$ or $P_{Rx}^{LP}/P_{Rx}^{HP}$. Moreover, since the reflected sound signal is reflected in the conversation-received sound signal, the change in the conversation-received sound signal also changes the reflected sound signal, and the sound signal distance value Δn is also dynamically changed. It has been proved through experiments that a dynamic spacing helps to improve the accuracy of watermark identification. Additionally, it should be noted that the values of the first value and the second value may still be changed depending on actual requirements, and are not limited by the embodiments of the disclosure.

With reference to FIG. 3, the processor 59 generates a second watermark sound signal $S''_{WM}$ according to the sound signal spacing Δn and a first watermark sound signal $S''_{WM}$ (step S330). Specifically, the second watermark sound signal $S''_{WM}$ and the first watermark sound signal $S''_{WM}$ have opposite phases and have the sound signal distance value Δn under the above virtual reflection condition. Their relationship may be expressed as follows:

$$S''_{WM}(n)=-S'_{WM}(n-\Delta n) \tag{5}$$

In other words, the second watermark sound signal $S''_{WM}$ is the first watermark sound signal $S''_{WM}$ in an opposite phase and with the time delay of Δn.

With reference to FIG. 2 and FIG. 3, the processor 59 synthesizes the first watermark sound signal $S''_{WM}$ and the second watermark sound signal $S''_{WM}$ to generate an output watermark sound signal $S'_{WM}$ (step S290). In an embodiment, the processor 59 further synthesizes the output watermark sound signal $S_{WM}$ and the conversation-received sound signal $S_{Rx}$ to generate a watermark-embedded signal $S_{Rx}+S_{WM}$, and transmits the watermark-embedded signal $S_{Rx}+S_{WM}$ through the communication transceiver 55. In another embodiment, the processor 59 separately transmits the output watermark sound signal $S_{WM}$ and the conversation-received sound signal $S_{Rx}$ through the communication transceiver 55.

The processor 19 of the conference terminal 10 receives the watermark sound signal $S_{WM}$ or the watermark-embedded signal $S_{Rx}+S_{WM}$ through the communication transceiver 15 via the network, to obtain a transmitted sound signal $S_A$ (i.e., the watermark sound signal $S_{WM}$ or the watermark-embedded signal $S_{Rx}+S_{WM}$ that is transmitted). Since the watermark sound signal $S_{WM}$ includes the conversation-received sound signal that is time-delayed and amplitude-attenuated (i.e., the reflected sound signal), the echo cancellation mechanism of the processor 19 can effectively eliminate the watermark sound signal Sw. Accordingly, a transmitted sound signal $S_{Tx}$ (e.g., the conversation-received sound signal that the conference terminal 10 intends to transmit via the network) on the communication transmission path is not affected.

Figure 5:
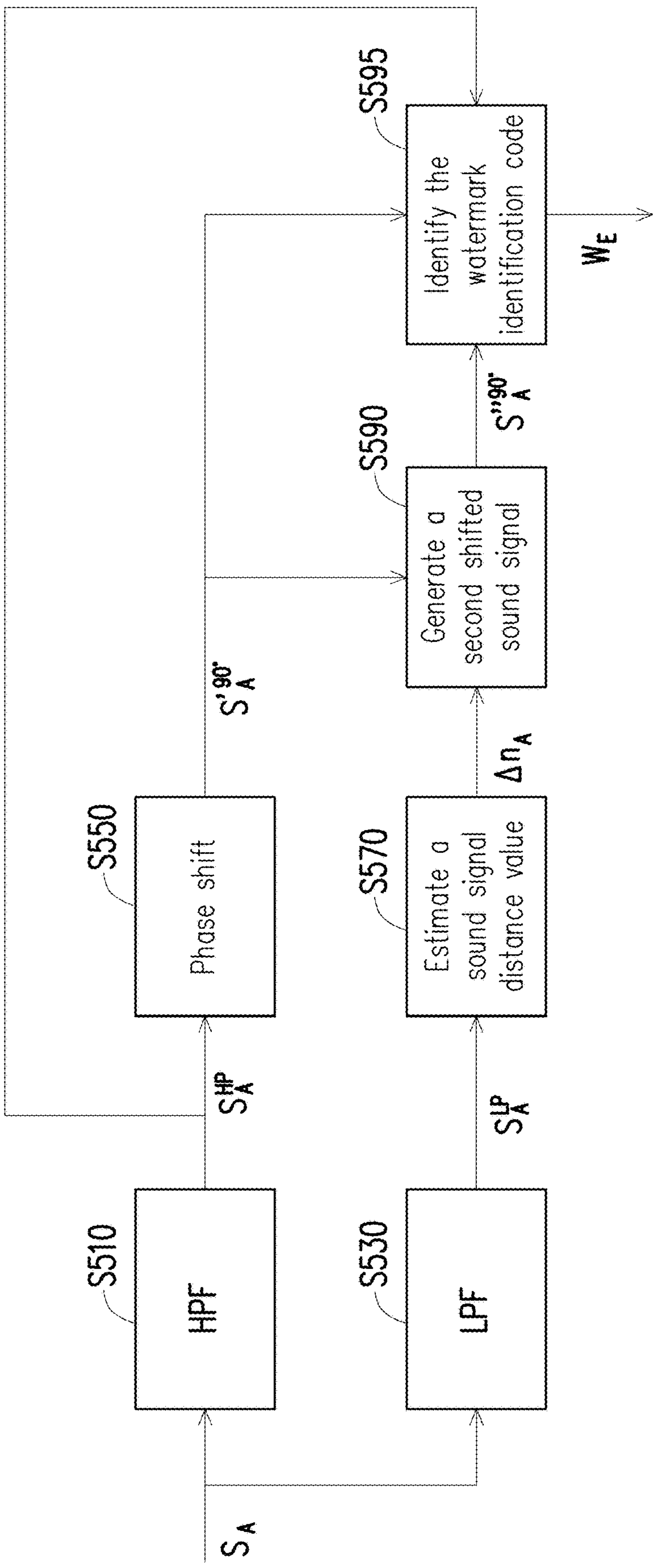
FIG. 5 is a flowchart of watermark identification according to an embodiment of the disclosure.

For identification of the watermark sound signal $S_{WM}$, FIG. 5 is a flowchart of watermark identification according to an embodiment of the disclosure. With reference to FIG. 5, in an embodiment, the processor 19 may perform high-pass filtering on the transmitted sound signal $S_A$ with a high-pass filtering HPF same as or similar to that described above (step S510), to output a transmitted sound signal $S_A^{HP}$ passing through high-pass filtering. In another embodiment, if the transmitting end does not adopt filtering, step S510 (i.e., the transmitted sound signal $S_A^{HP}$ is identical to the transmitted sound signal $S_A$) may be ignored. In an embodiment, the processor may perform low-pass filtering on the transmitted sound signal $S_A$ with a low-pass filtering LPF same as or similar to that described above (step S530), to output a transmitted sound signal $S_A^{LP}$ passing through low-pass filtering.

With reference to FIG. 5, the processor 19 shifts the phase of the transmitted sound signal $S_A$ to generate a first shifted sound signal $S'^{90°}_A$ (step S550). It should be noted that a binary encoded watermark identification code (i.e., only providing two values) is taken as an example in this embodiment, and the two values respectively correspond to, for example, phase shifts 90° and −90°. Nonetheless, if other encoding are adopted, there may be different phase shifts. Next, the processor 19 estimates a sound signal distance value $\Delta n_A$ according to the transmitted sound signal $S_A^{HP}$ passing through the low-pass filtering LPF (step S570). It should be noted that if the transmitting end adopts filtering and encodes only the high-frequency sound signal based on the watermark identification code, it means that the low-frequency sound signal is not affected by the watermark identification code and helps to estimate the sound signal distance value $\Delta n_A$.

In an embodiment, the processor 19 may estimate the sound signal distance value $\Delta n_A$ according to a correlation of the transmitted sound signal $S_A^{LP}$ under different time delays. For example, through an auto-cepstrum function (e.g., a Mel-frequency cepstrum coefficient (MFCC) or a linear prediction cepstrum coefficient (LPCC)), or other auto-correlation functions, the processor 19 measures the sound signal distance value $\Delta n_A$ corresponding to the local maximum of the transmitted sound signal $S_A^{HP}$ passing through the low-pass filtering LPF. For example, the sound signal distance value $\Delta n_A$ is 3 or 4.

The processor 19 generates a second shifted sound signal $S''^{90°}_A$ according to the first shifted sound signal $S'^{90°}_A$ and the estimated sound signal distance value $\Delta n_A$ (step S590). The relationship between the second shifted sound signal $S''^{90°}_A$ and the first shifted sound signal $S'^{90°}_A$ may be expressed as follows:

$$S''^{90°}_A(n)=S'^{90°}_A(n-\Delta n) \tag{6}$$

That is, the second shifted sound signal $S''^{90°}_A$ is the first shifted sound signal $S'^{90°}_A$ being time-delayed by $\Delta n$.

The processor 19 may obtain a correlation coefficient from determining a correlation (i.e., a first correlation) between the first shifted sound signal $S'^{90°}_A$ and the transmitted sound signal ($S_A$ or $S_A^{HP}$), and determining a correlation (i.e., a second correlation) between the second shifted sound signal $S'^{90°}_A$ and the transmitted sound signal ($S_A$ or $S_A^{HP}$). For example, the processor 19 calculates the cross-correlation between the first shifted sound signal $S'^{90°}_A$ and the transmitted sound signal ($S_A$ or $S_A^{HP}$) to obtain a first correlation $r'^{90°}_{HP}$, and calculates the cross-correlation between the second shifted sound signal $S''^{90°}_A$ and the transmitted sound signal ($S_A$ or $S_A^{HP}$) to obtain a second correlation $r'^{90°}_{LP}$. The processor 19 performs subtraction between the first correlation $r'^{90°}_{HP}$ and the second correlation $r'^{90°}_{LP}$ to obtain a correlation coefficient $R^{90°}_{HP}$. The correlation coefficient $R^{90°}_{HP}$ may be expressed as follows:

$$R_{HP}^{90°}=r'^{90°}_{HP}-r'^{90°}_{LP} \tag{7}.$$

The processor 19 may identify the watermark identification code according to the correlation coefficient $R^{90°}_{HP}$ (step S595). For example, if the processor 19 defines a threshold $Th_R$ (e.g., 0.3, 0.5, or 0.7), then an identified watermark identification code WE may be expressed as:

$$W_E=\begin{cases}1, & R^{90°}_{HP}>Th_R\\ 0, & R^{90°}_{HP}<-Th_R\\ N/A, & \text{else}\end{cases} \tag{8}$$

That is, if the correlation coefficient $R^{90°}_{HP}$ is higher than the threshold $Th_R$, the processor 19 determines that the value at this bit is a value corresponding to the phase shift 90° (e.g., 1). If the correlation coefficient $R^{90°}_{HP}$ is lower than the threshold $Th_R$, the processor 19 determines that the value at this bit is a value corresponding to the phase shift −90° (e.g., 0).

Figure 6A:
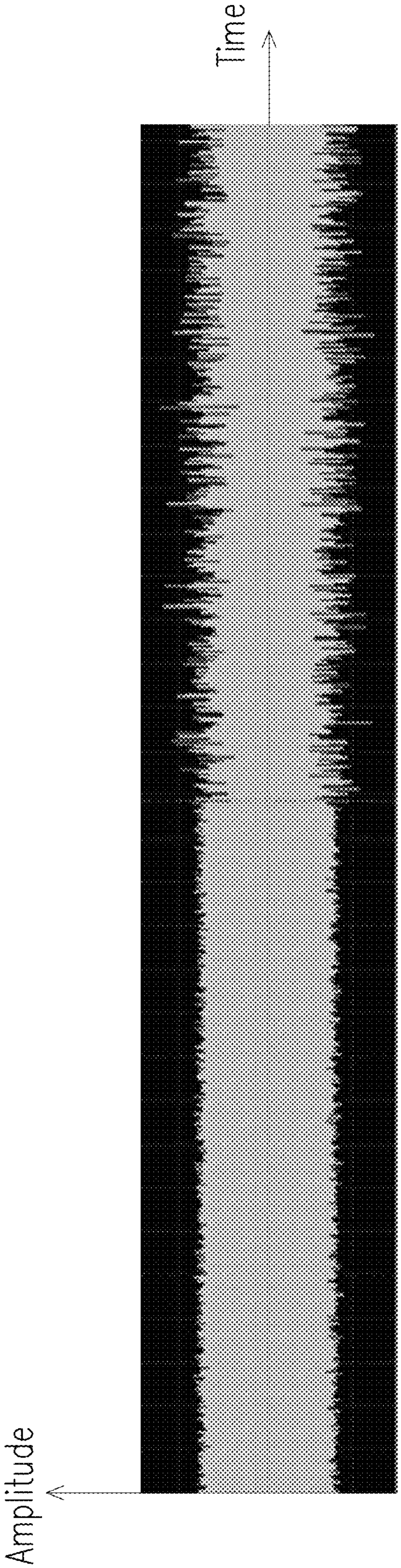
FIG. 6A exemplarily shows a simulation diagram of a conversation-received sound signal.
Figure 6B:
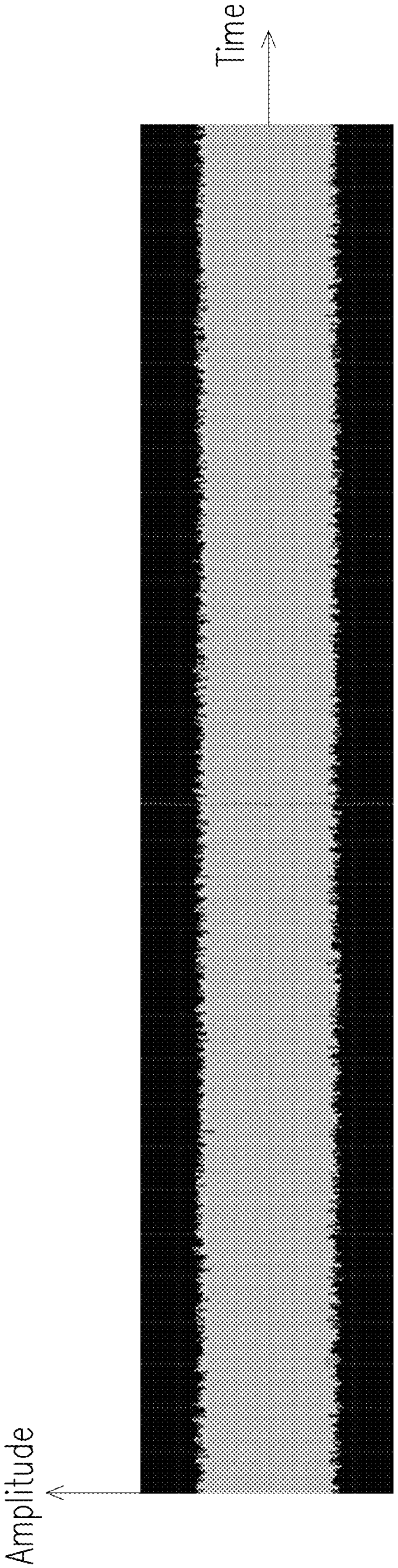
FIG. 6B exemplarily shows a simulation diagram of transmission of noise.

Further description aided by experiments is provided below. FIG. 6A exemplarily shows a simulation diagram of the conversation-received sound signal $S_{Rx}$. With reference to FIG. 6A, it is assumed that the first half section of the conversation-received sound signal $S_{Rx}$ is white noise, and the second half section is pink noise. In addition, FIG. 6B exemplarily shows a simulation diagram of transmission of noise NT. With reference to FIG. 6B, it is assumed that the sound signal (e.g., the watermark-embedded signal $S_{Rx}+S_{WM}$ or the output watermark sound signal $S_{WM}$) output during the transmission process is attenuated. The attenuation property is $0\leq\alpha_T\leq1$ (e.g., $\alpha_T=0.5$ or 0.3) and is interfered with by transmission noise $N_T$ (e.g., another white noise signal). If a power $P_N$ of the transmission noise $N_T$ increases, the difficulty for the receiving end to determine the watermark identification code increases. For example, the entire section of the transmission noise NT shown in FIG. 6B is a white noise sound signal, and the power $P_N$ is equal to the power of the conversation-received sound signal $S_{Rx}$ (i.e., same as the first half section of the conversation-received sound signal $S_{Rx}$). It has been proved through experiments that if a dynamic sound signal distance value is adopted, the identification result of the watermark identification code can be completely correct. For example, a ratio between the cross-correlation between watermark sound signals and the cross-correlation between non-watermark sound signals is 9.56. An increase in the ratio indicates increases in the receiving range of identification and the accuracy of identification result.

In summary of the foregoing, in the processing method of a sound watermark and the sound watermark generating apparatus of the embodiments of the disclosure, the sound signal distance value between two reflected sound signals to be simulated is dynamically determined according to the power ratio between the high-frequency sound signal and the low-frequency sound signal in the sound signal, and two watermark sound signals corresponding to the two reflected sound signals are generated based on the sound signal distance value. Accordingly, the power of the overall watermark sound signal can be reduced, and the correct rate of identification of the watermark identification code can be improved.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A processing method of a sound watermark, adapted for a conference terminal, wherein the conference terminal comprises a sound receiver, and the sound watermark processing method comprises:

obtaining a conversation-received sound signal through the sound receiver;

generating a reflected sound signal according to a virtual reflection condition and the conversation-received sound signal, wherein the virtual reflection condition comprises a positional relationship between the sound receiver, a sound source, and two external objects, and the reflected sound signal is a sound signal obtained from simulating a sound emitted by the sound source reflected by one of the external objects and recorded by the sound receiver;

generating a first watermark sound signal according to a watermark identification code and the reflected sound signal;

generating a second watermark sound signal according to a sound signal distance value and the first watermark sound signal, wherein the sound signal distance value is determined according to a high/low-frequency sound ratio of the reflected sound signal, and the sound signal distance value is related to a distance difference between two reflection distances of the sound emitted by the sound source under the positional relationship reflected by the two external objects and reaching the sound receiver; and synthesizing the first watermark sound signal and the second watermark sound signal to generate an output watermark sound signal.

2. The processing method according to claim 1, wherein after generating the reflected sound signal according to the virtual reflection condition and the conversation-received sound signal, the method further comprises:

performing a low-pass filtering on the reflected sound signal to generate a low-frequency sound signal; and performing a high-pass filtering on the reflected sound signal to generate a high-frequency sound signal, wherein the high/low-frequency sound ratio is a power ratio between the low-frequency sound signal and the high-frequency sound signal.

3. The processing method according to claim 2, wherein generating the second watermark sound signal according to the sound signal distance value and the first watermark sound signal comprises:

setting the sound signal distance value to a first value in response to a power of the high-frequency sound signal being not less than a power of the low-frequency sound signal; and setting the sound signal distance value to a second value in response to the power of the high-frequency sound signal being less than the power of the low-frequency sound signal, wherein the first value is greater than the second value.

4. The processing method according to claim 2, wherein generating the first watermark sound signal according to the watermark identification code and the reflected sound signal comprises:

shifting a phase of the reflected sound signal passing through the high-pass filtering according to the watermark identification code; and synthesizing at least one phase-shifted reflected sound signal and the reflected sound signal passing through the low-pass filtering to generate the first watermark sound signal.

5. The processing method according to claim 4, wherein a phase shift be achieved using Hilbert transform.

6. The processing method according to claim 4, further comprising:

receiving a transmitted sound signal via a network, wherein the transmitted sound signal comprises the output watermark sound signal that is transmitted;

shifting a phase of the transmitted sound signal to generate a first shifted sound signal;

estimating the sound signal distance value according to the transmitted sound signal passing through the low-pass filtering;

generating a second shifted sound signal according to the first shifted sound signal and the sound signal distance value that is estimated; and identifying the watermark identification code according to a first correlation and a second correlation, wherein the first correlation is a correlation between the first shifted sound signal and the transmitted sound signal, and the second correlation is a correlation between the second shifted sound signal and the transmitted sound signal.

7. The processing method according to claim 6, wherein the output watermark sound signal includes the conversation-received sound signal that is time-delayed and amplitude-attenuated.

8. The processing method according to claim 6, wherein a binary encoded watermark identification code is taken to shift the phase of the transmitted sound signal, and two values, which are provided by the binary encoded watermark identification code, respectively correspond to a phase shift 90° and a phase shift −90°.

9. The processing method according to claim 6, wherein before identifying the watermark identification code, the method further comprises:

performing the high-pass filtering on the transmitted sound signal, wherein the first correlation is a correlation between the first shifted sound signal and the transmitted sound signal passing through the high-pass filtering, and the second correlation is a correlation between the second shifted sound signal and the transmitted sound signal passing through the high-pass filtering.

10. The processing method according to claim 1, wherein generating the reflected sound signal according to the virtual reflection condition and the conversation-received sound signal comprises:

determining a time delay and an amplitude attenuation of the reflected sound signal relative to the conversation-received sound signal according to the positional relationship between the sound source and each of the external objects, wherein the sound signal distance value is a difference between the time delays corresponding to the two external objects.

11. A sound watermark generating apparatus, comprising:

a memory configured to store a programming code; and a processor coupled to the memory and configured to load and execute the programming code to:

obtain a conversation-received sound signal through a sound receiver;

generate a reflected sound signal according to a virtual reflection condition and the conversation-received sound signal, wherein the virtual reflection condition comprises a positional relationship between the sound receiver, a sound source, and two external objects, and the reflected sound signal is a sound signal obtained from simulating a sound emitted by the sound source reflected by one of the external objects and recorded by the sound receiver;

generate a first watermark sound signal according to a watermark identification code and the reflected sound signal;

generate a second watermark sound signal according to a sound signal distance value and the first watermark sound signal, wherein the sound signal distance value is determined according to a high/low-frequency sound ratio of the reflected sound signal, and the sound signal distance value is related to a distance difference between two reflection distances of the sound emitted by the sound source under the positional relationship reflected by the two external objects and reaching the sound receiver; and synthesize the first watermark sound signal and the second watermark sound signal to generate an output watermark sound signal.

12. The sound watermark generating apparatus according to claim 11, wherein the processor is further configured to:

perform a low-pass filtering on the reflected sound signal to generate a low-frequency sound signal; and perform a high-pass filtering on the reflected sound signal to generate a high-frequency sound signal, wherein the high/low-frequency sound ratio is a power ratio between the low-frequency sound signal and the high-frequency sound signal.

13. The sound watermark generating apparatus according to claim 12, wherein the processor is further configured to:

set the sound signal distance value to a first value in response to a power of the high-frequency sound signal being not less than a power of the low-frequency sound signal; and set the sound signal distance value to a second value in response to the power of the high-frequency sound signal being less than the power of the low-frequency sound signal, wherein the first value is greater than the second value.

14. The sound watermark generating apparatus according to claim 12, wherein the processor is further configured to:

shift a phase of the reflected sound signal passing through the high-pass filtering according to the watermark identification code; and synthesize at least one phase-shifted reflected sound signal and the reflected sound signal passing through the low-pass filtering to generate the first watermark sound signal.

15. The sound watermark generating apparatus according to claim 14, wherein a phase shift be achieved using Hilbert transform.

16. The sound watermark generating apparatus according to claim 14, wherein the processor is further configured to:

receive a transmitted sound signal via a network, wherein the transmitted sound signal comprises the output watermark sound signal that is transmitted;

shift a phase of the transmitted sound signal to generate a first shifted sound signal;

estimate the sound signal distance value according to the transmitted sound signal passing through the low-pass filtering;

generate a second shifted sound signal according to the first shifted sound signal and the sound signal distance value that is estimated; and identify the watermark identification code according to a first correlation and a second correlation, wherein the first correlation is a correlation between the first shifted sound signal and the transmitted sound signal, and the second correlation is a correlation between the second shifted sound signal and the transmitted sound signal.

17. The sound watermark generating apparatus according to claim 16, wherein the output watermark sound signal includes the conversation-received sound signal that is time-delayed and amplitude-attenuated.

18. The sound watermark generating apparatus according to claim 16, wherein a binary encoded watermark identification code is taken to shift the phase of the transmitted sound signal, and two values, which are provided by the binary encoded watermark identification code, respectively correspond to a phase shift 90° and a phase shift −90°.

19. The sound watermark generating apparatus according to claim 16, wherein the processor is further configured to:

perform the high-pass filtering on the transmitted sound signal, wherein the first correlation is a correlation between the first shifted sound signal and the transmitted sound signal passing through the high-pass filtering, and the second correlation is a correlation between the second shifted sound signal and the transmitted sound signal passing through the high-pass filtering.

20. The sound watermark generating apparatus according to claim 11, wherein the processor is further configured to:

determine a time delay and an amplitude attenuation of the reflected sound signal relative to the conversation-received sound signal according to the positional relationship between the sound source and each of the external objects, wherein the sound signal distance value is a difference between the time delays corresponding to the two external objects.

* * * * *